Aug. 5, 1958  C. M. SCHOTT  2,846,607
ELECTRON GUN
Filed Sept. 20, 1956
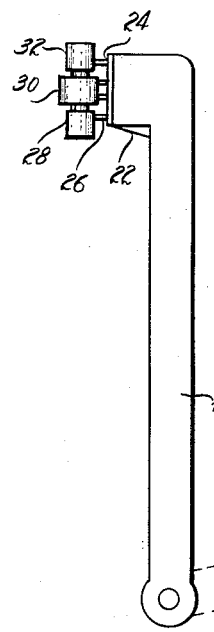
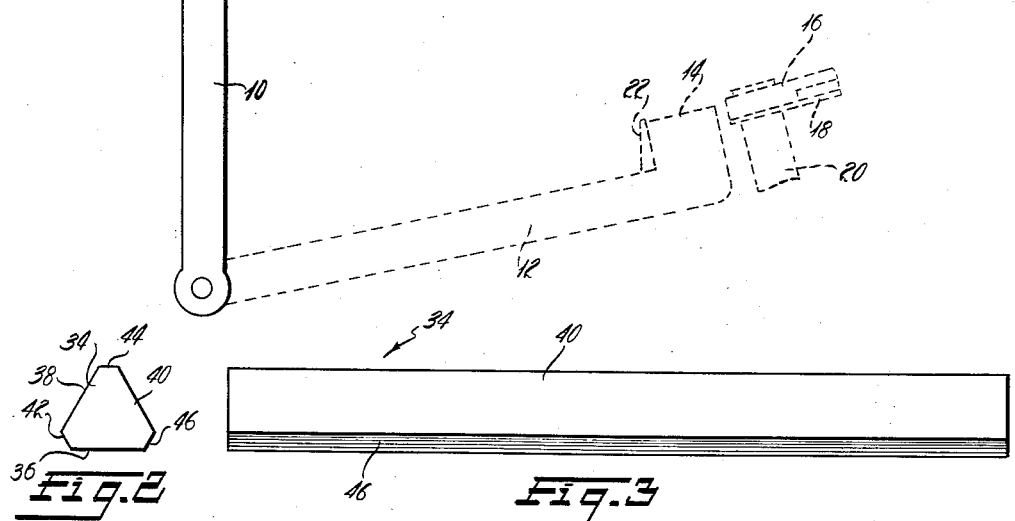
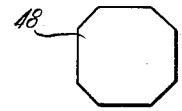
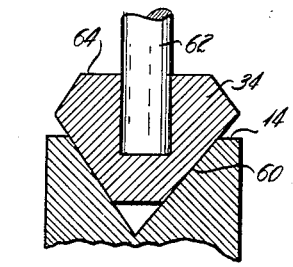
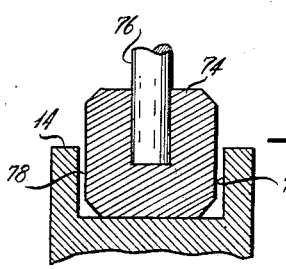
INVENTOR
CHARLES M. SCHOTT
BY
ATTORNEYS United States Patent Office 2,846,607
Patented Aug. 5, 1958

2,846,607

ELECTRON GUN

Charles M. Schott, Brookside, N. J., assignor to Thomas Electronics, Inc., Passaic, N. J., a corporation of New Jersey Application September 20, 1956, Serial No. 611,001

4 Claims. (Cl. 313—82)

This invention relates to cathode ray tubes and more particularly relates to the construction of the focusing header of cathode ray tubes.

The focusing header of a cathode ray tube is generally made up as a sub-assembly of the electrostatic cathode ray gun and consists of four component parts, a first anode, a focusing ring or cylinder, a second anode and a plurality of glass rods joining the other parts together. The anodes, which are conventionally in the form of cups, and the focusing ring are usually provided with short radial wire studs welded to their outer circumferential surfaces at 120° spaced locations. The parts are assembled by accurately locating the two anodes and ring along a common axis, heating the glass rods to a plastic state, impaling the rods on the stud, and cooling the assembly to lock all components together in their originally assembled position. An automatic machine for performing this assembly operation is disclosed in assignee's copending application Serial No. 531,939, filed September 1, 1955, in the name of Charles M. Schott and having the title Focusing Header Assembly Machine.

The glass rods heretofore used have been generally circular or D-shaped in cross section and, in a machine of the type disclosed in the aforementioned application, are fed down troughs onto press arms which then impale the rods on the wire studs. The grooves in the troughs which receive the rods are similar in shape to the lower portion of the rods received and, in the case of the D-shaped rods, a means is provided for ejecting rods which enter the trough in an improper orientation. With the circular rods a circular surface is of course presented to the studs and, to the extent of my knowledge, where D-shaped rods have been used the circular portion has been bottomed in the trough and the opposite side presented to the studs.

Several disadvantages are encountered in the use of these types of rods. In the first place, nesting the circular or curved surface in the troughs during the impaling operation causes studs which are slightly out of line to either deflect or rock the rod in the trough so that the studs enter the surface at an angle which provides poor structural rigidity in the finished header assembly. When D-shaped rods are used the groove in the trough is rectangular in cross section and a certain amount of side clearance must be provided in order to allow the rods to enter the trough easily and in order to permit free sliding motion therealong. The press arm which forces the rods against the studs must also provide for clearance, especially since the rods feed from the trough into the groove in the end of the arm. If the clearance in the groove in the end of the arm is made too small it is difficult to feed the rods from the trough to the arm rapidly and without jamming. Where the clearance is adequate to solve this problem it is frequently found that if the rod is at either side of the groove in the end of the arm the stud enters the rod improperly or is deflected off of the surface thereof.

I have now found that the foregoing difficulties may be eliminated and the operation of an automatic focusing header assembly machine greatly facilitated if the glass rods have a cross sectional shape which is an equilateral polygon and where a flat face is presented to the studs. Under these conditions the rods always are fed into the troughs in proper orientation and, in the preferred embodiment, the troughs are simply V-shaped so that all clearance problems are eliminated while absolute accuracy is assured. The elimination of the clearance problem and the use of a flat face practically eliminates improper entrance of the studs into the rods.

It is accordingly a primary object of the present invention to provide a cathode ray tube focusing header assembled with novel rods which are easily and accurately assembled into a rigid structure.

It is another object of the invention to provide an improved focusing header assembly for a cathode ray tube which is susceptible of economical automatic manufacture.

It is another object of the invention to provide an improved focusing header assembly of a cathode ray tube wherein a plurality of electrodes in said assembly are joined together by means of rods having equilateral polygonal cross sections.

These and further objects and advantages of the invention shall become apparent upon reference to the following specification and claims and appended drawings wherein:

Figure 1 is a side elevation showing the press arm of the focusing header assembly machine impaling a rod;

Figure 2 is an end view of a rod formed according to the present invention;

Figure 3 is a side elevation of the rod of Figure 2;

Figure 4 is an end view of another form of rod according to the invention;

Figure 5 is an end view of still another rod according to the invention;

Figure 6 is a vertical cross section showing the impaling of the rod of Figures 2 and 3;

Figure 7 is a vertical cross section showing the impaling of the rod of Figure 5; and Figure 8 is a vertical cross section showing the impaling of the rod of Figure 4.

Referring to Figure 1 there is shown at 10 the press arm of a focusing header assembly machine which may be of the type disclosed in assignee's copending application Serial No. 531,939, filed September 1, 1955, in the name of Charles M. Schott and having the title Focusing Header Assembly Machine. This arm is rotated between a lower position shown in broken lines at 12, and a vertical position shown in solid lines. When the arm is in its lower position the end 14 thereon is opposite the lower end of a trough 16 through which glass rods 18 slide. The trough 16 is supported by a bracket 20 which has means associated therewith for stopping downward movement of the rods 18 until the arm 12 places end 14 in position to receive such a rod. The top of end 14 of arm 12 is grooved to receive the rod 18 and is provided with a stop 22 which arrests the downward movement of the rods. After a rod has been loaded onto the end 14 of arm 12 and the rod has been softened by burners (not shown) the arm is rotated counterclockwise into its vertically upright position, whereupon a rod 24 is impaled upon the studs 26 projecting from a first anode 28, a focusing ring or cylinder 30, and a second anode 32. The rod stop 22 is then retracted downwardly and the arm 10 rotates in a clockwise direction back to its lower position whereupon the cycle is repeated. This mechanism is described in detail in assignee's aforementioned copending application.

According to the preferred embodiment of my invention the rods are provided with an equilateral polygonal shape as shown, for example, in Figures 2, 4 and 5. The sharp corners of the polygons may of course be rounded off without interfering with the assembly of the rods. Thus referring to Figure 2, which shows the preferred form of rod, there is seen a triangular rod 34 having three equilateral faces 36, 38 and 40 with the sharp edges cut away at 42, 44 and 46. In Figure 4 a rod 48 having a square cross section is shown, while in Figure 5 a rod 50 is shown having an octagonal cross section.

Referring to Figure 6 the rod 34 is shown received in the end 14 of a press arm. The end 14 is provided with a V-shaped groove 60 which receives two of the faces of the rod which is impaled upon a wire stud 62. It will be apparent from an inspection of Figure 6 that so long as the rod 34 is settled in a stable position in groove 60 it is properly oriented and presents a flat face 64 to the stud 62. The rod slides freely without the necessity for providing any clearance, as in the case of a rod having a square bottom, and maximum utilization is made of the glass or other material in the rod. That is to say, the rod provides an ample depth for penetration of the stud 62 while utilizing a minimum of cross sectional area about the stud. Because of the flat surface 64 there is no tendency for the stud to be deflected from entering the rod perpendicularly and accuracy of centering of the rod with respect to the studs is assured despite slight variations in dimensions of the rods. This is to be contrasted with the situation which exists in the case of a rod having a square bottom or a D-shape wherein an oversize rod does not fit properly in the slot and an undersize rod probably is incorrectly positioned with respect to the stud.

Referring to Figure 7 the octagonal rod 58 is shown received in the end 14 of a press arm which has a V-shaped groove 66 therein. Again the rod is always properly positioned once it is stably settled in the groove and it always presents a flat surface 68 to the stud 70.

In Figure 8 there is shown a square rod 48 received within a square groove 72 in the end 14 of a press arm. The rod again presents a flat surface 74 to the stud 76, although in this instance it is necessary to provide some clearance 78 about the sides of the rod in order to permit proper feeding. Because of this the embodiment of the invention shown in Figure 8 is not as advantageous as those shown in Figures 6 and 7 wherein it is possible to utilize a V-shaped groove in the end of the press arm. Despite this, however, the rod shown in Figure 8 is markedly superior to the circular or D-shaped rods utilized heretofore wherein the stud 76 was pressed into a curved surface, so that placement of the rod against one side of the square groove frequently resulted in bending and improper entry of the stud into the rod.

In the preferred embodiment of the invention the rods are of a cross sectional shape such that faces of the rod which lie at least partially on the far side of the median of the cross section from the electrode converge. This permits the use of a V-shaped trough which eliminates clearance difficulties. It will be apparent that triangles, pentagons, hexagons, heptagons, octagons and many other equilateral polygons meet this requirement. While my invention has been described in connection with the assembly of a focusing header it will be apparent to those skilled in the art that rods of this type can also be utilized for assembling other electrodes in a cathode ray tube.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A cathode ray tube gun comprising a pair of spaced electrodes each having at least two studs projecting radially therefrom, and a pair of spaced rods connected to said studs and securing said electrodes to one another, each rod being impaled on a stud on each of said electrodes, said rods having a uniform cross section throughout, said cross section being such that each of said rods has at least three flat surfaces, one of said flat surfaces being perpendicular to said studs and pierced thereby, and two of said flat surfaces being located on the side of said rods opposite said first surface and converging toward each other as they extend away from said first surface, said cross section being that of an equilateral polygon.

2. A cathode ray tube gun as set out in claim 1 wherein the cross sectional shape of said rods is substantially triangular.

3. A cathode ray tube gun as set out in claim 1 wherein each electrode has three studs located 120° apart, the studs of the different electrodes being aligned with one another, and three rods impaled on the respective sets of studs.

4. A cathode ray tube gun as set out in claim 1 including three electrodes axially alined, said electrodes comprising a first anode, a focusing electrode and a second anode, said studs lying in planes passing through the common axis of said electrodes, the axes of said rods lying in said planes.

References Cited in the file of this patent

UNITED STATES PATENTS

| | | |
|---|---|---|
| 2,096,466 | Painter | Oct. 19, 1937 |
| 2,183,309 | Fleschsig et al. | Dec. 12, 1939 |
| 2,707,848 | Pityo | May 10, 1955 |